United States Patent [19]

Paschke et al.

[11] 4,383,084

[45] May 10, 1983

[54] POLYAMIDE-POLYOLEFIN COMPOSITIONS

[75] Inventors: Edward F. Paschke, Wheaton; Michael A. Stasi, Downers Grove; Edward F. Rader, Wheaton, all of Ill.

[73] Assignee: Standard Oil Company (Indiana), Chicago, Ill.

[21] Appl. No.: 263,571

[22] Filed: May 14, 1981

[51] Int. Cl.³ .................................................. C08L 77/00
[52] U.S. Cl. ..................................................... 525/184
[58] Field of Search ......................................... 525/184

[56] References Cited

U.S. PATENT DOCUMENTS

| | | | |
|---|---|---|---|
| 3,646,157 | 2/1972 | Grosjean | 525/184 |
| 3,822,227 | 7/1974 | Hermann | 525/184 |
| 3,932,262 | 1/1976 | Schneider | 525/184 |
| 4,293,662 | 10/1981 | Heydenreich | 525/184 |
| 4,321,336 | 3/1982 | Meyer | 525/184 |

FOREIGN PATENT DOCUMENTS

| | | | |
|---|---|---|---|
| 2753577 | 6/1979 | Fed. Rep. of Germany | 525/184 |
| 5147045 | 10/1974 | Japan | 525/184 |
| 54-155222 | 12/1979 | Japan | 525/184 |
| 1201101 | 8/1970 | United Kingdom | 525/184 |

*Primary Examiner*—Paul Lieberman
*Attorney, Agent, or Firm*—William C. Clarke; William T. McClain; William H. Magidson

[57] ABSTRACT

Compositions of amorphous polyamides which are thermoplastic and characterized by an improved impact resistance which comprise terephthalamide and/or isophthalamide polymers, physically blended with polyolefin polymers.

8 Claims, No Drawings

POLYAMIDE-POLYOLEFIN COMPOSITIONS

BACKGROUND OF THE INVENTION

The field of this invention relates to synthetic linear polyamide polymers and copolymers characterized by an improved impact resistance and which are thermoplastic and easily moldable by injection or vacuum molding techniques or by extrusion to form a large variety of useful shaped articles.

Linear fiber-forming polyamides suitable for use in manufacture of useful textile fibers have been made by condensing terephthalic acid with polymethylenediamines. These polyamides are typical nylon polymers, being opaque, highly crystalline, easily drawn to form useful textile fibers and melting over a narrow temperature range.

The drawback of such resins, which are known for their properties such as hardness, high tensile strength, toughness and rigidity, is their generally high rigidity resulting in low impact strength, especially at low temperatures.

In the past, it has been proposed to combine linear, crystalline polyamides with other hydrocarbon polymers to obtain less rigid and more flexible polyamides. While an improvement was accomplished in these properties of these highly crystalline nylon polymers, a deterioration of other properties was observed compared with the properties of original crystalline polymer. In one proposed method, U.S. Pat. No. 3,150,117 describes amorphous copolyamides based on aromatic dicarboxylic acids with aryl-substituted hexamethylenediamine. The copolyamides are made by condensing terephthalic acid, isophthalic acid and mixtures thereof with a hexamethylenediamine containing at least three side chain carbon atoms introduced by alkyl substitution of the main hydrocarbon chain. Suitable hexamethylenediamines taught are 2-methyl-4-ethylhexamethylenediamine; 2-ethyl-4-methylhexamethylenediamine; 2,2,4-trimethylhexamethylenediamine; 3-isopropylhexamethylenediamine; etc. The polyamides produced are amorphous, are soluble in typical polyamide solvents such as sulfuric acid, formic acid, phenol and cresol, and are transparent and thermoplastic but have a low capacity for elongation. The polyamides have similar properties whether made with terephthalic acid, isophthalic acid or with mixtures of the two. However, the polyamides with no more than 10% of isophthalic acid are preferred because of noticeable deterioration in mechanical properties such as tensile strength, impact resistance, flexural strength, etc. with acid mixtures containing more than 10% isophthalic acid. Melting points of polyamides made from mixtures of acids of compositions over 20% isophthalic acid dropped sharply and did not go through an eutectic point. The copolyamides are suitable for forming shaped articles and, when liquified in solvents, may be useful in coatings or adhesives, but do not form useful textile fibers because of their amorphous state.

In another proposed method, U.S. Pat. No. 4,210,742 describes transparent polyamides having lower water absorption, increased resistance to hydrolysis, good dimensional stability under the influence of moisture and correspondingly improved mechanical and electrical properties. These polyamides are obtained by reacting isophthalic acid or derivative thereof and, if desired, terephthalic acid and/or derivative thereof and a diamine substituted with alkyl or cycloalkyl groups. U.S. Pat. No. 4,210,743 teaches a similar process to obtain transparent copolyamides with improved mechanical properties obtained by reacting salts of isophthalic acid and/or salts of terephthalic acid with substituted diamines.

High impact predominantly crystalline nylon molding compounds with higher Izod impact resistance are obtained in molded objects by compositions of crystalline polyamides with other modifying groups in the molecule. U.S. Pat. No. 3,388,186 teaches that compositions of crystalline nylon-6 containing ethylene copolymer having a minor proportion of acrylic or methacrylic acid or alkyl ester thereof as backbone and having grafted polycaproamide side chains show higher impact resistance than nylon-6 molding compositions not containing the above graft copolymer. U.S. Pat. No. 3,472,916 teaches blends of 70-98% by weight crystalline nylon-6 homopolymer with 2-30% by weight of ethylene/acrylic or methacrylic alkyl ester copolymer having improved Izod impact resistance, compared to nylon-6 alone. U.S. Pat. No. 3,963,799 teaches ternary blends of crystalline polyamide, polyethylene or copolymer thereof and an amount of copolymer having ethylene backbone and polycaproamide side chains. The graft copolymers are considered to be anchored within the polymer molecule by amine reactive sites provided by the comonomer.

Other blends of polyamides and polyolefins are known. U.S. Pat. No. 3,093,255 teaches a process for preparing a blend wherein each component is present in the amount of at least 5 percent by weight. The polyamides are designated as being nylon-6 or nylon 66. Blends of modified polyethylene and a polyamide are known to make hot melt coatings and transparent packaging materials as taught in U.S. Pat. No. 3,484,403. U.S. Pat. No. 3,626,026 describes a blend of an ethylene copolymer and a polyamide used as hot melt compositions. The ethylene copolymer contains vinyl acetate or ethyl acrylate. Other blends have also been disclosed such as a polyamide-ethylene copolymer blend containing diphenyl carbonate (Netherlands Pat. No. 71-03319 to Imperial Chemicals Inds. Ltd.); polyolefin and polyamide blends with sulphonate as crystallization accelerator (German Pat. No. 2,002,650); a homogeneous polyamide-polyolefin blend containing an oxidized wax to improve impact strength (German Pat. No. 2,038,317); a polyamide and polyolefin blend, a copolymer obtained by grafting an unsaturated dicarboxylic acid into an olefin polymer, and a compound which can be an aromatic carboxylic acid. (British Pat. No. 1,403,797).

Accordingly, a number of methods and compositions have been taught to obtain polyamides of modified properties, including impact resistance. Specific teachings have been directed to modifying amorphous polyamides by introducing modifying groups into the polymer molecule. Crystalline polyamides such as nylon 6 and nylon 66 are taught as being modified to obtain desired mechanical properties through use of blends with other polymers with modified physical characteristics. However, compositions of amorphous polyamides which are thermoplastic and characterized by an improved impact resistance and which comprise terephthalamide and/or isophthalamide polymers physically blended with polyolefin polymers have not been previously known.

SUMMARY OF THE INVENTION

Compositions of amorphous polyamides which are thermoplastic and characterized by an improved impact resistance which comprise terephthalamide and/or isophthalamide polymers physically blended with polyolefin polymers.

DETAILS OF THE INVENTION

This invention relates to amorphous polyamides and to compositions of amorphous polyamides with improved mechanical properties. Impact strength as measured by Izod impact, Gardner impact and tensile impact is improved without seriously sacrificing other desirable physical properties.

Although amorphous polyamides can be molded into useful articles, amorphous polyamides suffer from the problem as typically demonstrating low impact strength which can cause a molded article to deform under stress and shatter easily.

It is accordingly an object of this invention to provide an amorphous polyamide with improved impact properties and methods of making the same. It is an object of this invention to provide novel amorphous polyamide compositions with improved impact properties and a method for making the same.

The amorphous polyamides of this invention are compositions of amorphous polyamides melt compounded with small percentages by weight of polyolefins selected from the group consisting of high density polyethylene, low density polyethylene and polypropylene. Compatible dyestuffs, plasticizers, stabilizers, bleaching agents can be added to the polyamide reaction mixture. The preferred polyamide resins are produced from definite ratios of terephthalic acid and isophthalic acid with suitable hexamethylene diamine. A preferred composition is 40 parts of terephthalic acid and 60 parts of isophthalic acid although compositions of each of equal parts can be utilized. Suitable hexamethylenediamines are hexamethylenediamine, 2-methyl-4-ethylhexamethylenediamine, 2-ethyl-4-methylhexamethylenediamine; 2,2,4-trimethylhexamethylenediamine; 2,4,4-trimethylhexamethylenediamine; 2,2,5,5-tetramethylhexamethylenediamine; 3-isopropylhexamethylenediamine; 3-isooctylhexamethylenediamine; 3-isodecylhexamethylenediamine, 2,2-di(4-aminocyclohexyl)propane and 2,4-diethylhexamethylenediamine. Such compositions tend to show little or no crystallinity with the tendency for crystallization decreasing with increasing isophthalic acid content. Unexpectedly, it has been found that melt compounding of small percentages of polyolefin polymers such as polyethylene and polypropylene with amorphous polyamides of the above compositions demonstrate increased impact resistance. Conversely, it has been found that melt compounding of small percentages of these same polyolefin polymers with crystalline polyamides such as nylon 6 and nylon 66 result in compounds with greatly reduced impact resistance.

The process of this invention can be practiced by mixing pellets of polyolefin polymers and amorphous polyamide, heating with minimum exposure to air and oxygen at a temperature at which the polyamide has been thermally softened or melted, subjecting the mass of polyolefin polymer and amorphous polyamide to a pressure in excess of 500 pounds per square inch and effecting turbulence and interkneading of the compounds with concomitant high shearing action, and fabricating into a shape which is or can be converted to the desired article.

This has been done on laboratory and commercial extrusion machines of the type used in preparing polyamide sheets and tubes, with employment of small outlet openings so that, at a given rate of material feed and machine operation, a high back pressure gradient is developed from the outlet orifice toward the inlet hopper. For continuous extrusion, such machines employ a screw for advancing the charge from the hopper through the heating zone to the outlet orifice, and it has been found that so-called mixing screws are desirable to promote the turbulence and shearing action, in contrast with ordinary metering screws. The polyamide and polyolefin compounds can be introduced in the usual form of pellets, that is, fragments about 1/16 to ¼ inch long and about 1/16 inch diameter. These are weighed in making batches, and then tumbled together for uniformity of mixture, noting that at this stage the bulk densities are so closely alike that there is no observable particle size separation during tumbling or in the hopper.

It has been found that improved impact resistance of amorphous polyamides is obtained by extrusion melt blending a polyolefin polymers with amorphous polyamides comprising a composition of from zero parts per hundred to 100 parts terephthalamide and from 100 parts isophthalamide to zero parts per hundred isophthalamide and wherein the composition of the blended polyolefin and polyamide mixture or blend comprises a maximum of 10 weight percent polyolefin, preferably a maximum of 5 weight percent polyolefin polymer, most preferably from about 2.5 to 5 percent by weight of combined weight of polyolefin polymer and polyamide polymer. It has been found that blends of polyolefin polymers with amorphous polyamides at these low levels improve the Izod impact strength significantly while not deleteriously affecting any other property. Blends of more than 10 weight percent polyolefin polymers with amorphous polyamides demonstrate, surprisingly, declines in impact strength of the resulting composition. Additionally, the blending of polyolefin polymers at low levels with crystalline polyamides significantly affects harmfully the impact strength of crystalline polyamide.

This invention accordingly relates to novel compositions comprising blends of amorphous polyamides and low levels of polyolefin polymers which demonstrate improved impact properties over the impact properties of polyamide compositions comprising amorphous polyamides in the absence of polyolefin polymers. These blended compositions are obtained by physically blending amorphous polyamides with quantities of polyolefin polymers not to exceed 10 weight percent, preferably not to exceed 5 weight percent, of the composition comprising amorphous polyamide and polyolefin polymer. The polyolefin polymers are selected from the group consisting of high density polyethylene, low density polyethylene and polypropylene. The amorphous polyamides comprise terephthalamide and isophthalamide polymers wherein the polyamides are obtained by reacting terephthalic acid and/or derivatives in a ratio of from zero parts per hundred to up to 100 parts per hundred of isophthalic acid and/or derivatives with suitable diamines. The resulting amorphous polyamines have increased impact strength and are thermoplastic.

In order to facilitate a clear understanding of the invention, the following specific embodiments are described in detail. It should be understood, however, that the detailed expositions of the instant invention, while indicating preferred embodiments, are given by way of illustration only since various changes and modifications within the spirit and scope of the invention will become apparent to those skilled in the art from this detailed description.

EXAMPLE I

The following procedure is representative of the preparation of the amorphous polyamides and the extrusion compounding of the resulting polyamide with a polyolefin polymer.

A reaction mixture of 239.2 gm (1.44 moles) terephthalic acid, 358.9 gm (2.16 moles) isophthalic acid, 430.1 gm (3.701 moles—2.8% molar excess based on terephthalic acid plus isophthalic acid) hexamethylenediamine, 342.5 gm (19.01 moles) water, 3.68 gm (0.072 mole-2.0 mole % based on terephthalic acid plus isophthalic acid) formic acid, and 0.444 gm (500 ppm based on theoretical yield of polymer) sodium hypophosphite was placed in an Atlantic Research 4CV Helicone reactor. The reactor blades (turning down at 53 rpm) and the hot oil system (400° F. heat setting) were started.

After 34 minutes the pressure and melt temperature were 116 psig and 386° F. A pressure of 130 psig (maximum for the reaction) was reached after 45 minutes. At this point the temperature of the clear melt was 392° F. Fifteen minutes after reaching a melt temperature of 385° F., i.e., 49 minutes into the reaction, the heat setting was increased to 570° F., and pressure release was begun. The pressure was released from 130 to 100 psig over 10 minutes. At this point, 56 minutes into the reaction, the melt temperature was 437° F.

After holding the melt at 100 psig for 25 minutes (melt temperature 557° F.), the pressure was released to 0 psig over 15 minutes: to 35 psig over 6 minutes, from 35 to 10 psig over 4 minutes, and from 10 to 0 psig over 5 minutes. When 0 psig was reached, 99 minutes after starting the reaction (559° F. melt temperature), a nitrogen sweep at a rate of 1.0 standard cubic foot per hour was started. The reaction mixture was held under the nitrogen sweep for 5 minutes and then dumped into water. The final melt temperature was 560° F. Product inherent viscosity was 0.85 dl/g, 60/40 phenol/tetrachloroethane at 30° C. and 0.4 g/100 ml concentration.

All preparations followed the same general procedure. Product inherent viscosity was controlled by time of N$_2$ sweep. Reactions targeted for a 590° F. final melt temperature differed in that at 15 minutes after 385° F. melt temperature was reached, the heat setting was increased to 600° F. rather than to 570° F. as when the final melt temperature target was 560° F.

The resulting amorphous polyamide was extruded in a laboratory Brabender twin screw extruder in 1/16 inch diameter pellets, the extruder being equipped with a mixing attachment.

Polyethylene pellets, high density, specific gravity 0.957, mixed in a ratio of 5 parts by weight with 95 parts by weight of amorphous polyamide pellets were extruded in a laboratory Brabender twin screw extruder with a mixing attachment. The blend was vacuum dried overnight prior to extrusion. The extruded rod was cooled in water, granulated, and dried. Pellets containing 2.5 and 10 parts by weight polyolefin were prepared. The pellets were injection molded using an Arburg 220/E machine to prepare a number of ASTM test specimens suitable for determination of properties. The physical properties of the resulting polyolefin-amorphous polyamide mixture, as compared with a control were as shown in Table I. ASTM references are also indicated.

TABLE I

Properties of Polyolefin-Polyamide Resin
Resin - 40/60 Copolyamide[a]

|  | Control |  |  |  |
| --- | --- | --- | --- | --- |
| Percent Polyolefin by Wt. | 0 | 2.5 | 5 | 10 |
| Inherent Viscosity | 1.04 |  |  |  |
| Heat Deflection Temp, °F. @ 264 psi (ASTM D648) | 223 | 214 | 218 | 213 |
| Notched Izod Impact, ft-lb/in (ASTM D256) | 0.62 | 3.16 | 3.35 | 2.13 |
| Flexural Modulus, psi @ 73° F. × 10$^{-3}$ (ASTM D790) | 393 | 361 | 370 | 364 |
| Yield Tensile Strength, psi @ 73° F. (ASTM D638) | 12600 | 11500 | 12000 | — |
| Ultimate Tensile Strength, psi @ 73° F. (ASTM D638) | 10900 | 10000 | 11000 | 10900 |
| Elongation at Break, % (ASTM D638) | 41.06 | 93.4 | 63.2 | 7.1 |
| Elongation at Yield, % (ASTM D638) | 7.28 | 7.2 | 7.45 | — |
| Tensile Impact Strength, ft-lb/in$^2$ (ASTM D1822) | 56.3 | 63.9 | 42.6 | 36.8 |

[a]40 parts terephthalamide/60 parts isophthalamide

The above data indicate the improvement in Izod impact strength with 2.5 to 10 percent by weight of polyolefin.

EXAMPLE II

The procedure of Example I was repeated using a polyamide resin of 60 parts by weight of terephthalamide and 40 parts by weight of isophthalamide with high density polyethylene, specific gravity 0.957. Results are in Table II.

TABLE II

Properties of Polyolefin-Polyamide Resin
Resin - 60/40 Copolyamide

|  | Control |  |  |
| --- | --- | --- | --- |
| Percent Polyolefin by Wt. | 0 | 2.5 | 5.0 |
| Heat Deflection Temp, °F. @ 264 psi | 240 | 245 | 247 |
| Notched Izod Impact, ft-lb/in | 2.30 | 3.28 | 3.21 |
| Flexural Modulus, psi @ 73° F. × 10$^{-3}$ | 456 | 437 | 445 |
| Flexural Strength, psi @ 73° F. | 22700 | 20600 | 20900 |
| Yield Tensile Strength, psi @ 73° F. | 13900 | 13900 | 13500 |
| Ultimate Tensile Strength, psi @ 73° F. | 11200 | 11300 | 11200 |
| Elongation at Break, % | 80.4 | 80.2 | 77.3 |
| Elongation at Yield, % | 7.3 | 7.2 | 7.2 |
| Tensile Impact Strength, ft-lb/in$^2$ | 129 | 125 | 180 |

The above data indicate the improvement in impact strength of a 60/40 copolymer blend with a polyolefin.

EXAMPLE III

The procedure of Example I was repeated using a commercially-available amorphous polyamide, a condensation product of 2,2,4-trimethylhexamethylenediamine as the diamine and terephthalate acid, under the name Trogamid T (Trademark) of Kay-Fries, Inc., Dynamit Nobel Group, Montvale, New Jersey. The polyolefin was high density polyethylene, specific gravity 0.957. Results are in Table III. Increased Izod impact strength was obtained by addition of high density polyethylene.

TABLE III

Properties of Polyolefin-Polyamide Resin
Resin-Trogamid T ™
(100% Terephthalamide)

|  | Control |  |
|---|---|---|
| Percent Polyolefin by Wt. | 0 | 5 |
| Heat Deflection Temp, °F. @ 264 psi | 257 | 264 |
| Notched Izod Impact, ft-lb/in | 1.7 | 3.1 |
| Flexural Modulus, psi @ 73° F. × 10$^{-3}$ | 416 | 373 |
| Yield Tensile Strength, psi @ 73° F. | 11200 | 10800 |
| Ultimate Tensile Strength, psi @ 73° F. | 12200 | 6340 |
| Elongation at Break, % | 210 | 18.2 |
| Elongation at Yield, % | 8.0 | 7.3 |
| Tensile Impact Strength, ft-lb/in$^2$ | 213 | 37.4 |

EXAMPLE IV

The procedure of Example I was repeated using a crystalline polyamide nylon 66 with high density polyethylene, specific gravity 0.957. Results are in Table IV. Decreased Izod impact strength resulted by incorporation of high density polyethylene into nylon 66.

TABLE IV

Properties of Polyolefin-Polyamide Resin
Resin-Nylon 66

|  | Control |  |  |  |  |
|---|---|---|---|---|---|
| Percent Polyolefin by Wt. | 0 | 2.5 | 5 | 10 | 20 |
| Heat Deflection Temp, °F. @ 264 psi | 164 | 167 | 158 | 167 | 148 |
| Notched Izod Impact, ft-lb/in | 1.45 | 0.72 | 0.72 | 0.71 | 0.82 |
| Flexural Modulus, psi @ 73° F. × 10$^{-3}$ | 419 | 397 | 410 | 364 | 316 |
| Yield Tensile Strength, psi @ 73° F. | 11300 | — | — | — | 8200 |
| Ultimate Tensile Strength, psi @ 73° F. | 8030 | 7400 | 8020 | 10350 | 7930 |
| Elongation at Break, % | 38.7 | 2.36 | 2.50 | 4.29 | 23.0 |
| Elongation at Yield, % | 5.2 | — | — | — | 6.5 |
| Tensile Impact Strength, ft-lb/in$^2$ | 60.6 | 62.8 | 38.0 | 43.9 | 24.4 |

The above data indicate the diminished impact strength resulting from melt-mixing of a polyolefin with a crystalline polyamide, nylon 66.

EXAMPLE V

The procedure of Example I was repeated with nylon 66 as the polyamide and using low density polyethylene (LDPE) and polypropylene (PP) as the polyolefins. The results are in Table V.

TABLE V

Properties of Polyolefin-Polyamide Resin
Resin-Nylon 66

|  | Control | LDPE | PP |
|---|---|---|---|
| Percent Polyolefin by Wt. | 0 | 2.5 | 2.5 |
| Heat Deflection Temp, °F. @ 264 psi | 164 | 168 | 170 |
| Izod Impact, ft-lb/in | 1.45 | 0.82 | 0.80 |
| Flexural Modulus, psi × 10$^{-3}$ | 419 | 417 | 426 |
| Yield Tensile Strength, psi | 11300 | 10800 | 10800 |

TABLE V-continued

Properties of Polyolefin-Polyamide Resin
Resin-Nylon 66

|  | Control | LDPE | PP |
|---|---|---|---|
| Elongation at Yield, % | 5.2 | 5.0 | 5.9 |
| Ultimate Tensile Strength, psi | 8030 | 11300 | 7700 |
| Elongation at Break, % | 38.7 | 21 | 34 |
| Tensile Impact Strength, psi | 60.6 | 39 | 39 |

The above data indicate the effect of melt mixing density polyethylene and polypropylene on nylon 66. Impact Strength is diminished.

EXAMPLE VI

The procedure of Example I was repeated using 40/60 terephthalic acid (TA)/isophthalic acid (IA) copolyamide, nylon 66 and high density polyethylene.

Gardner impact data were obtained in the following procedure: Nylon 66 and high density polyethylene (HDPE) were ground through a 1 mm screen. The nylon 66 was vacuum dried overnight at 120° C. A dry blend of 424.5 g of nylon 66 and 10.89 g of HDPE was extruded at 265° C. using a Brabender extruder equipped with a twin-screw mixing attachment. Nylon 66 was extruded using identical conditions as a control. The extrudates were water quenched, ground to 2 mm, and vacuum dried at 120° C. overnight. The products were injection molded using an Arburg 220E machine with 510° and 520° F. zone temperatures, 530° F. nozzle temperature, and a 44 second cycle time to form 50 mil thick Gardner plaques. The molded specimens were placed in plastic bags to keep them "dry, as molded" prior to testing. Testing was performed using ASTM conditions.

The above procedure was repeated using identical conditions and ratios except the polyamide was an amorphous copolymer of 40/60 mole ratio of terephthalic/isophthalic acid and 1,6-hexamethylene diamine.

Gardner impact data were as follows in Table VI. The Gardner impact data were consistent with Izod impact data in Example I, Table I.

TABLE VI

Gardner Impact Data (in-lb)

|  | % Polyethylene | |
|---|---|---|
| Polymer | 0 | 2.5 |
| Nylon 66 | 316 | 33 |
| 40/60 TA/IA Copolyamide | 5.0 | 32.7 |

EXAMPLE VII

The procedure of Example I was repeated using a commercially-available amorphous polyamide, a condensation product of 2,2-di(4-aminocyclohexyl)propane as the diamine and isophthalic acid, under the name Amidel (Trademark) of Emser Werke, A. G. of Zurich, Switzerland. The polyamide was melt compounded with 2.5 (wt) percent high density polyethylene (HDPE) in pellets using a laboratory Brabender twin screw extruder equipped with a mixing attachment. Density of the HDPE was 0.957. Temperature at point of melt compounding was 280° C. A control sample without the addition of high density was also melt compounded at 280° C. Physical properties of the resulting compounds were as shown in Table VII. Notched Izod impact resistance of the amorphous 100% isophthalamide was increased without significant decrease in other physical properties.

TABLE VII

Properties of Polyolefin-Polyamide AMIDEL ™ Resin (100% Isophthalamide)

|  | Control |  |
|---|---|---|
| Percent Polyolefin by Wt. | 0 | 2.5 |
| Heat Deflection Temp., °F. at 264 psi | 256 | 255 |
| Notched Izod Impact, ft-lb/in | 0.9 | 1.3 |
| Flexural Modulus, psi @ 73° F. × 10$^{-3}$ | 304,000 | 287,000 |
| Yield Tensile Strength, psi at 73° F. | 10,700 | 10,500 |
| Ultimate Tensile Strength, psi at 73° F. | 9,500 | 8,500 |
| Elongation at Break, % | 118 | 109 |
| Elongation at Yield, % | 7.7 | 7.7 |

EXAMPLE VIII

The procedure of Example I was repeated using a polyamide resin of 40 parts by weight of terephthalamide and 60 parts by weight of isophthalamide with high density polyethylene, specific gravity 0.957. Results are in Table VIII. The data indicate Izod impact strength is increased by melt-mixing high density polyethylene with a polyamide of 40 parts by weight of terephthalamide and 60 parts by weight of isophthalamide.

TABLE VIII

Properties of Polyolefin-Polyamide Resin

|  | Control |  |  |  |
|---|---|---|---|---|
| Percent Polyolefin by Wt. | 0 | 2.5 | 5.0 | 10.0 |
| Heat Deflection Temp., °F. at 264 psi | 223 | 214 | 218 | 213 |
| Izod Impact, ft-lb/in | 0.62 | 3.16 | 3.35 | 2.13 |
| Flexural Modulus, psi @ 73° F. × 10$^{-3}$ | 393 | 361 | 370 | 364 |
| Yield Tensile Strength, psi at 73° F. | 12,600 | 11,500 | 12,000 | — |
| Elongation at Yield, % | 7.3 | 7.2 | 7.5 | — |
| Ultimate Tensile Strength, psi | 10,900 | 10,000 | 11,000 | 10,900 |
| Elongation at Break, % | 41 | 93 | 63 | 7.1 |
| Tensile Impact Strength, psi | 56 | 64 | 43 | 37 |

EXAMPLE IX

The procedure of Example I was repeated using a polyamide resin of 40 parts by weight of terephthalamide and 60 parts by weight of isophthalamide with low density polyethylene (LDPE) specific gravity 0.926, and polypropylene (PP). Results are in Table IX. Izod impact strength was increased by melt-mixing low density polyethylene and polypropylene with polyamide resin.

TABLE IX

Properties of Polyolefin-Polyamide Resin

|  | Control | LDPE | PP |
|---|---|---|---|
| Percent Polyolefin by Wt. | 0 | 2.5 | 2.5 |
| Heat Deflection Temp., °F. at 264 psi | 223 | 220 | 227 |
| Izod Impact, ft-lb/in | 0.62 | 1.57 | 1.54 |
| Flexural Modulus, psi @ 73° F. × 10$^{-3}$ | 393 | 410 | 386 |
| Yield Tensile Strength, psi at 73° F. | 12,600 | 12,700 | 12,500 |
| Elongation at Yield, % | 7.3 | 7.4 | 7.3 |
| Ultimate Tensile Strength, psi | 10,900 | 12,200 | 10,600 |

TABLE IX-continued

Properties of Polyolefin-Polyamide Resin

|  | Control | LDPE | PP |
|---|---|---|---|
| Elongation at Break, % | 41 | 162 | 124 |
| Tensile Impact Strength, psi | 56 | 253 | 115 |

What is claimed is:

1. A composition comprising a polyamide of amorphous structure and a polyolefin selected from the group consisting of low density polyethylene, high density polyethylene and polypropylene wherein said composition is characterized by improved impact resistance and contains said polyolefin from about 2.5 to 5 percent by weight of the combined weight of said polyamide and said polyolefin, said polyamide being selected from the group consisting of polymers and copolymers of terephthalamide and isophthalamide wherein said terephthalamide and isophthalamide are present in ratios by weight of from 100 parts to zero parts per hundred isophthalamide and from zero parts to 100 parts per hundred terephthalamide.

2. The composition of claim 1 wherein said polyamide is prepared from a diamine selected from the group consisting of hexamethylenediamine, 2-methyl-4-ethylhexamethylenediamine; 2-ethyl-4-methylhexamethylenediamine; 2,2,4-trimethylhexamethylenediamine; 2,4,4-trimethylhexamethylenediamine; 2,2,5,5-tetramethylhexamethylenediamine; 3-isopropylhexamethylenediamine; 3-isooctylhexamethylenediamine; 3-isodecylhexamethylenediamine; 2,2-di(4-aminocyclohexyl)propane; and 2,4-diethylhexamethylenediamine.

3. The composition of claim 2 wherein the said diamine is hexamethylenediamine and said terephthalamide and isophthalamide are present in ratios by weight of from 60 parts per hundred to zero parts terephthalamide and from 40 parts per hundred to 100 parts isophthalamide.

4. The composition of claim 3 wherein said terephthalamide and isophthalamide are present in ratios by weight of 40 parts of terephthalamide to 60 parts of isophthalamide.

5. A process for producing a composition comprising a polyamide of amorphous structure and a polyolefin selected from the group consisting of low density polyethylene, high density polyethylene and polypropylene wherein said composition is characterized by improved impact resistance and contains said polyolefin from about 2.5 to 5 percent by weight of the combined weight of said polyamide and said polyolefin, said polyamide being selected from the group consisting of polymers and copolymers of terephthalamide and isophthalamide wherein said terephthalamide and isophthalamide are present in ratios by weight of from 100 parts to zero parts per hundred isophthalamide and from zero parts to 100 parts per hundred terephthalamide which process comprises melt mixing said polyamide and said polyolefin at a temperature at which said polyamide has been thermally softened, subjecting the mass of said polyamide and polyolefin to a pressure in excess of 500 pounds per square inch.

6. The process of claim 5 wherein said polyamide is prepared from a diamine selected from the group consisting of hexamethylenediamine, 2-methyl-4-ethylhexamethylenediamine; 2-ethyl-4-methylhexamethylenediamine; 2,2,4-trimethylhexamethylenediamine; 2,4,4-trimethylhexamethylenediamine; 2,2,5,5-tetramethylhexamethylenediamine; 3-isopropylhexamethylenediamine; 3-isooctylhexamethylenediamine; 3-isodecylhexamethylenediamine; 2,2-di(4-aminocyclohexyl)propane; and 2,4-diethylhexamethylenediamine.

7. The process of claim 6 wherein the said diamine is hexamethylenediamine and solid terephthalamide and isophthalamide are present in ratios by weight of from 60 parts per hundred to zero parts terephthalamide and from 40 parts per hundred to 100 parts isophthalamide.

8. The process of claim 7 wherein said terephthalamide and isophthalamide are present in ratios by weight of 40 parts of terephthalamide to 60 parts of isophthalamide.

* * * * *